US012677722B2

(12) United States Patent　　　　(10) Patent No.:　US 12,677,722 B2

Fay, II　　　　　　　　　　　　　　(45) Date of Patent:　Jul. 14, 2026

(54) AUTOMATED HEADER RETAINING SYSTEM FOR LATERAL TRANSPORT CENTER-PIVOT MOWER

(71) Applicant: CNH Industrial America LLC, New Holland, PA (US)

(72) Inventor: Jeffrey Fay, II, Oxford, PA (US)

(73) Assignee: CNH Industrial America, New Holland, PA (US)

( * ) Notice: Subject to any disclaimer, the term of this patent is extended or adjusted under 35 U.S.C. 154(b) by 486 days.

(21) Appl. No.: 18/203,755

(22) Filed: May 31, 2023

(65) Prior Publication Data

US 2024/0397872 A1　　Dec. 5, 2024

(51) Int. Cl.
| *A01B 73/00* | (2006.01) |
| *A01D 41/14* | (2006.01) |
| *A01D 75/00* | (2006.01) |

(52) U.S. Cl.
CPC .......... *A01B 73/005* (2013.01); *A01D 41/145* (2013.01); *A01D 75/004* (2013.01)

(58) Field of Classification Search
CPC ... A01B 73/005; A01D 41/145; A01D 75/004
See application file for complete search history.

(56) References Cited

U.S. PATENT DOCUMENTS

| 3,038,286 | A |  | 6/1962 | Hall |
| 3,535,860 | A |  | 10/1970 | Schwalm et al. |

| 3,814,191 | A |  | 6/1974 | Tilbury |  |
| 4,418,518 | A | * | 12/1983 | Koch ..................... | A01B 73/00 |
|  |  |  |  |  | 172/679 |
| 4,460,193 | A | * | 7/1984 | Dietz ................... | A01D 67/005 |
|  |  |  |  |  | 172/383 |
| 5,566,536 | A |  | 10/1996 | Krafka et al. |  |
| 6,209,297 | B1 | * | 4/2001 | Yeomans ............. | A01B 73/005 |
|  |  |  |  |  | 56/228 |
| 6,273,449 | B1 | * | 8/2001 | Harkcom ............... | B60D 1/145 |
|  |  |  |  |  | 280/491.3 |

(Continued)

FOREIGN PATENT DOCUMENTS

| EP | 0503395 A1 | 9/1992 |
| EP | 2965613 A1 | 1/2016 |

(Continued)

*Primary Examiner* — Arpad Fabian-Kovacs

(74) *Attorney, Agent, or Firm* — Buchanan Ingersoll & Rooney PC

(57) ABSTRACT

An agricultural mower includes a chassis, a wheel coupled to the chassis, and a header unit coupled to the chassis. A first actuator is configured to move the header unit between a field position, in which the wheel contacts a ground surface to support the header unit, and to an elevated position in which the header unit is positioned further from the ground as compared with the field position. A first retaining element is mounted to the chassis. A second retaining element is mounted to the header unit. The second retaining element is configured to be releasably engaged to the first retaining element. A second actuator is provided for moving the first retaining element from a first position in which the first retaining element is remote and disengaged from the second retaining element to a second position in which the first retaining element is engaged with the second retaining element.

15 Claims, 8 Drawing Sheets

(56)                     References Cited

U.S. PATENT DOCUMENTS

| | | | |
|---|---|---|---|
| 6,511,278 B1 | 1/2003 | Harkcom et al. | |
| 7,926,249 B1 * | 4/2011 | Cook ................... | A01B 73/005 |
| | | | 172/240 |
| 9,565,800 B2 * | 2/2017 | Fay, II .................... | A01D 57/28 |
| 9,596,808 B2 * | 3/2017 | Fay, II ................. | A01B 73/005 |
| 9,603,306 B2 | 3/2017 | Fay, II | |
| 10,631,452 B2 * | 4/2020 | Fay, II ................... | A01B 63/22 |
| 11,343,953 B2 | 5/2022 | Fay, II et al. | |
| 11,547,034 B2 * | 1/2023 | Fay, II ................. | A01D 67/005 |
| 2013/0284469 A1 * | 10/2013 | Barnett ................. | A01D 43/06 |
| | | | 172/452 |
| 2020/0055545 A1 * | 2/2020 | Chen ...................... | B62D 13/00 |
| 2022/0000019 A1 * | 1/2022 | Kemmerer ........... | A01D 34/283 |

FOREIGN PATENT DOCUMENTS

| | | | | |
|---|---|---|---|---|
| EP | 3884751 A1 * | 9/2021 | ........... | A01D 75/004 |
| EP | 3884765 A1 * | 9/2021 | ........... | A01D 75/004 |
| WO | WO-2018220433 A1 * | 12/2018 | ........... | A01D 41/141 |

* cited by examiner

AUTOMATED HEADER RETAINING SYSTEM FOR LATERAL TRANSPORT CENTER-PIVOT MOWER

TECHNICAL FIELD

The subject disclosure relates to transport arrangements for agricultural machines, and, more particularly, relates to an arrangement for the machine, such as an agricultural mower, to enable the machine to be transitioned to a transport mode such that the header is retained in an elevated position.

BACKGROUND

As is described in U.S. Pat. No. 9,603,306 to CNH Industrial America LLC, which is incorporated by reference in its entirety and for all purposes, agricultural mowers and mower/conditioners, hereinafter referred to simply as mowers, are well known and include self-propelled and pull-behind types. A problem with pull-behind mowers involves the transporting of the machines between fields, since the width of the machine may exceed practical or regulatory limits. Machine movement may be necessary over farm lanes, through gates or on highways where the machine width will not allow passage in the operating orientation.

A typical solution is to place the mower-conditioner header mechanism on a separate trailer such that the lateral width of the mechanism is generally aligned with the length of the trailer (lateral transport) and then tow the trailer with the tractor. One such example is the Discbine™ Transporter (by common assignee) which is specifically configured for loading, unloading, and laterally transporting a Model 1441/1442 disc mower conditioner while attached to the operating power unit (tractor). Such special trailers add significant cost, requires significant skill to load and unload, and must be used to transport the machine between locations or separately transported.

It would be advantageous to provide a reconfigurable and automated transport arrangement for supporting a pull-behind mower header to be laterally transported while attached to a tractor and retaining the header of the mower in an elevated position without requiring an additional implement or special trailer. Further advantages would be realized by a lateral transport system that is quickly and easily transitioned to a passively retained header in an elevated position in the lateral transport configuration.

SUMMARY OF THE INVENTION

According to an aspect of the invention, an agricultural mower includes a chassis, a wheel coupled to the chassis, and a header unit coupled to the chassis. A first actuator is configured to move the header unit between a field position, in which the wheel contacts a ground surface to support the header unit, and to an elevated position in which the header unit is positioned further from the ground as compared with the field position. A first retaining element is mounted to the chassis. A second retaining element is mounted to the header unit. The second retaining element is configured to be releasably engaged to the first retaining element. A second actuator is provided for moving the first retaining element from a first position in which the first retaining element is remote and disengaged from the second retaining element to a second position in which the first retaining element is engaged with the second retaining element such that the chassis can support at least a portion of the weight of the header unit via the engaged first and second retaining elements.

BRIEF DESCRIPTION OF THE DRAWINGS

Corresponding reference characters indicate corresponding parts throughout the several views. The exemplification set out herein illustrates an embodiment of the subject disclosure, and such exemplification is not to be construed as limiting the scope of the subject disclosure in any manner.

DETAILED DESCRIPTION OF THE INVENTION

Figure 1:
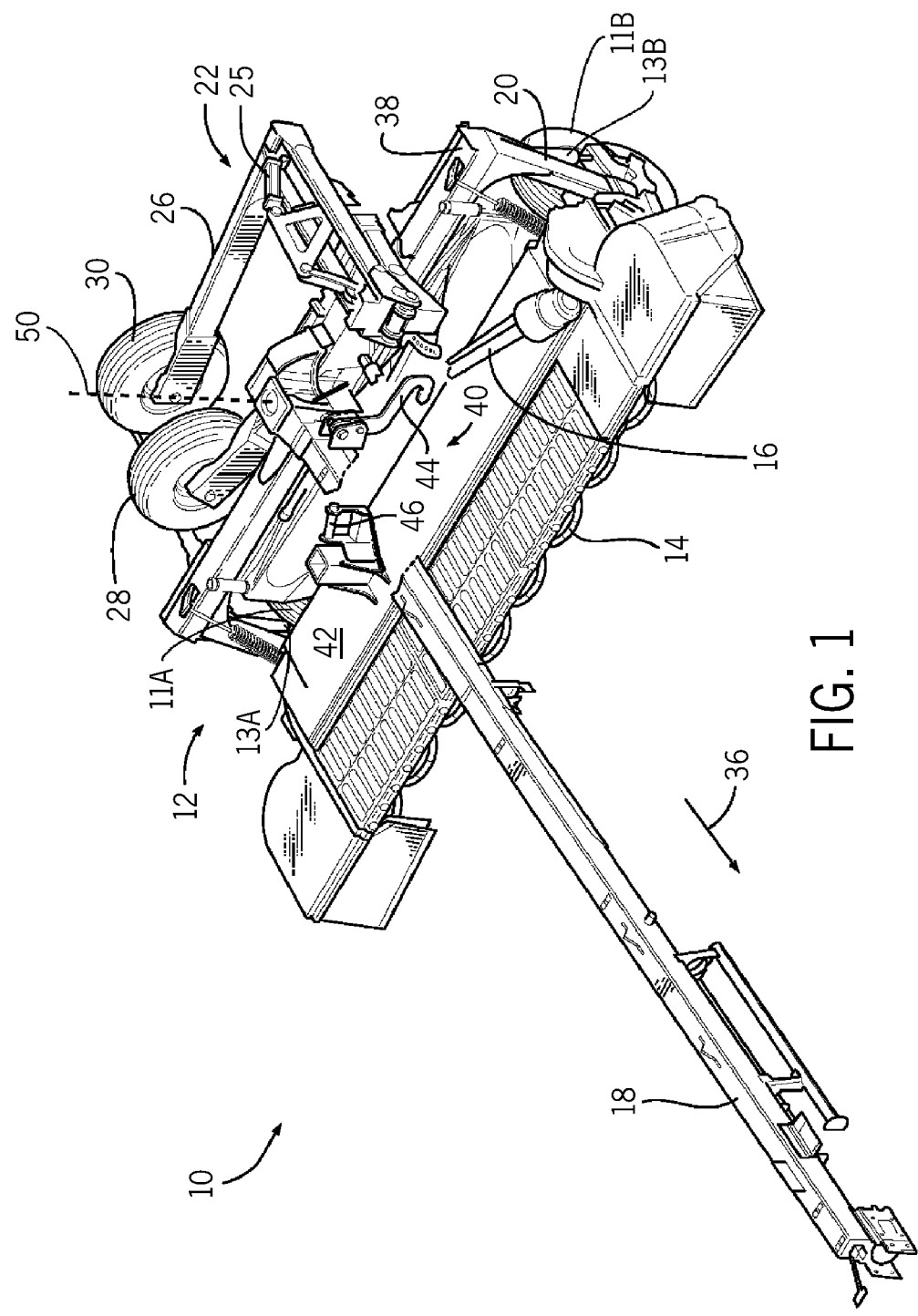
FIG. 1 is a perspective view of an agricultural machine in the form of a mower including a transport arrangement in the stowed position with part of the structure cut away to illustrate an embodiment of a retaining system of the present application.

FIG. 1 depicts a perspective view of an agricultural machine in the form of a mower 10, which can be attached to a tractor (not shown). Mower 10 generally includes a pair of wheels 11A and 11B and a chassis 12, which carries a number of other components such as crop engaging blades 14, and drive components 16. A tongue 18 is pivotally connected to chassis 12, an end of which can be connected to the tractor. A field suspension system 20 supports mower 10 while mower 10 is in a field mode. Mower 10 additionally includes a transport arrangement 22, which, when deployed, provides the support for the transport of mower 10. Crop engaging blades 14 can be disc cutter blades 14 or a sickle bar, or another crop cutting device. Mower 10 additionally includes a retaining system 40 for the passive coupling of a header 42 to tongue 18. Retaining system 40 includes a hook 44, e.g., a first retaining element, and a retaining pin 46, e.g., a second retaining element.

Now, additionally referring to FIGS. 2-8, transport arrangement 22 includes suspension elements 24 and 26, which respectively have transport wheels 28 and 30 connected to corresponding ends of suspension elements 24 and 26. Suspension elements 24 and 26 are rotatable about an axis 32, when suspension element 26 is in the position shown in FIGS. 4-8. Additionally, suspension element 26 is rotatable about an axis 34 as it transitions from a stowed position illustrated in FIGS. 1-3 to the position shown in FIG. 4. Axis 32 is generally perpendicular to axis 34.

When suspension element 26 is in the stowed position it is generally above, or at least vertically elevated above, suspension element 24. Additionally, suspension element 26 is somewhat shorter than suspension element 24, as can be particularly seen in FIG. 2, where it can also be seen that suspension element 26 is positioned such that wheel 30 is behind wheel 28 when transport arrangement 22 is in a stowed position.

Figure 2:
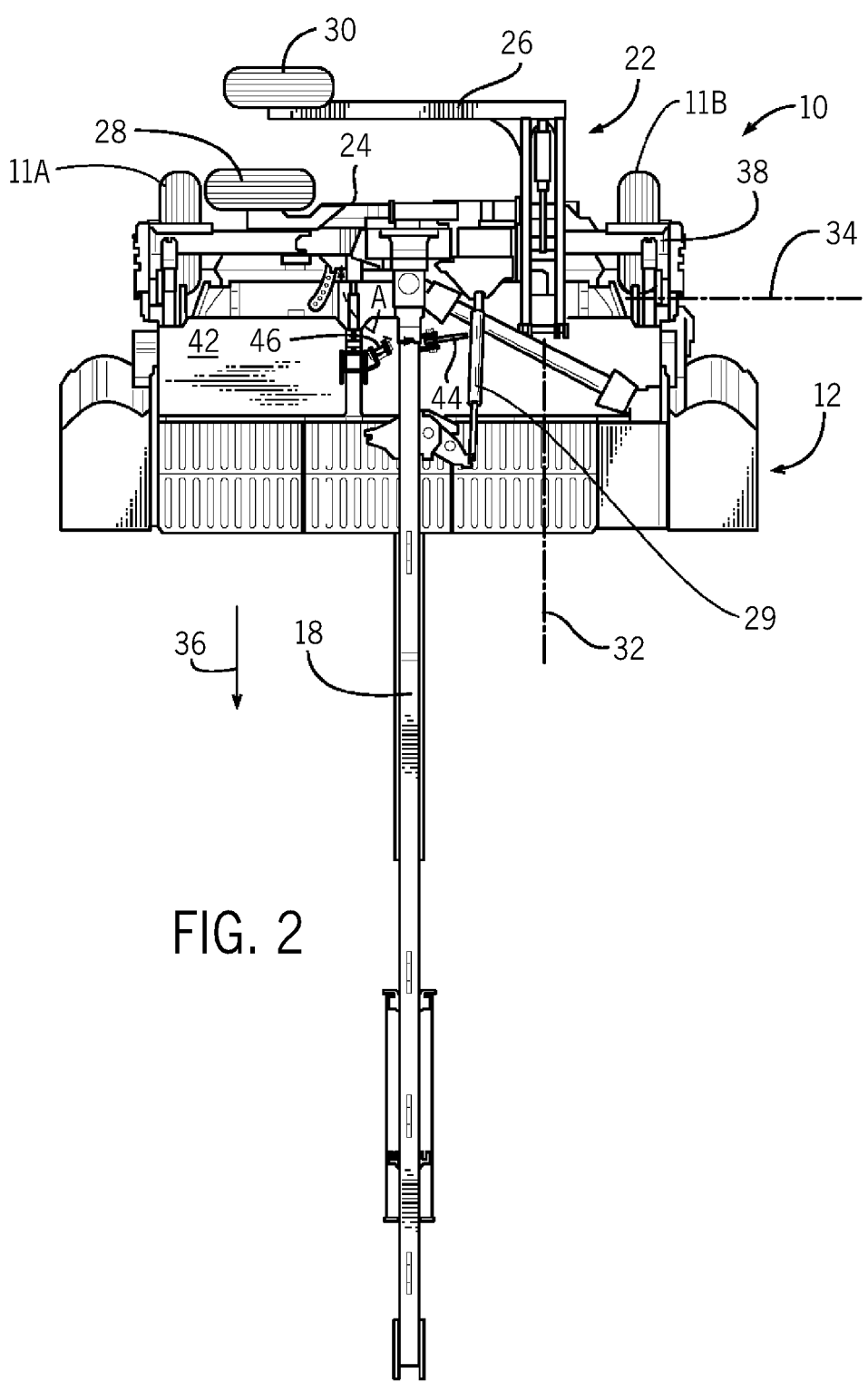
FIG. 2 is a top view of the mower with the retaining system shown in FIG. 1.
Figure 3:
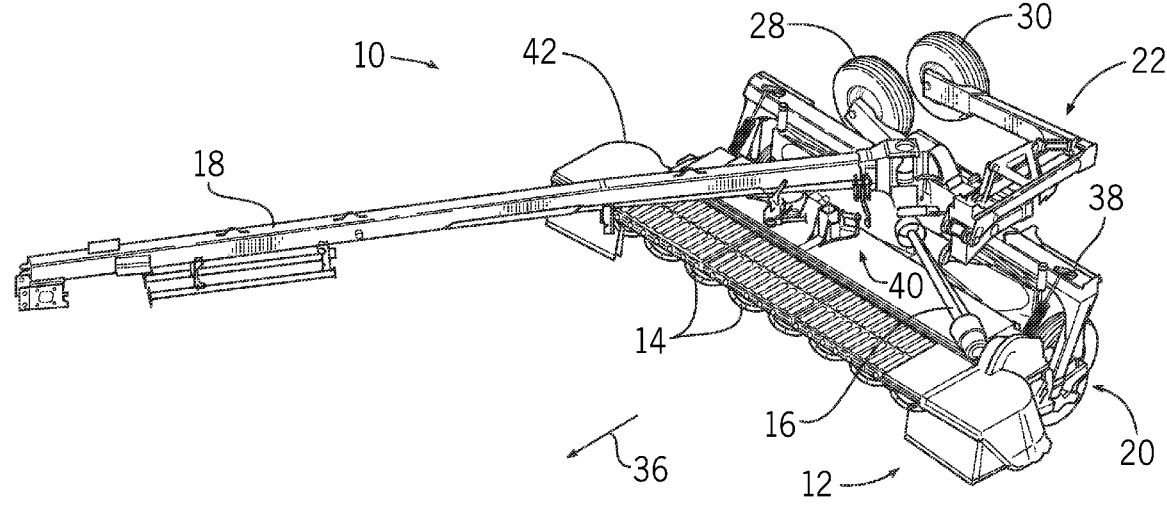
FIG. 3 is a perspective view of the mower shown in FIGS. 1 and 2, with the tongue shifted to a field use position.

A sequence of movements of the elements of mower 10 will now be discussed with references to the various figures. FIGS. 1 and 2 illustrate transport arrangement 22 in a stowed position and tongue 18 is angularly positioned in a substantially forward direction 36. This is a configuration in which mower 10 can be used, but generally mower 10 will be used with tongue 18 located to either side, such as that shown in FIG. 3. FIG. 3 illustrates a predetermined position for tongue 18 to be located to allow the needed clearance for suspension element 26 to be rotated about axis 34 by a primary lateral transport cylinder 25, as shown fully deployed, in FIG. 4. Initially the field wheels 11A and 11B associated with field suspension system 20 are fully extended by lift cylinders 13A and 13B, respectively, to lift chassis 12.

Figure 4:
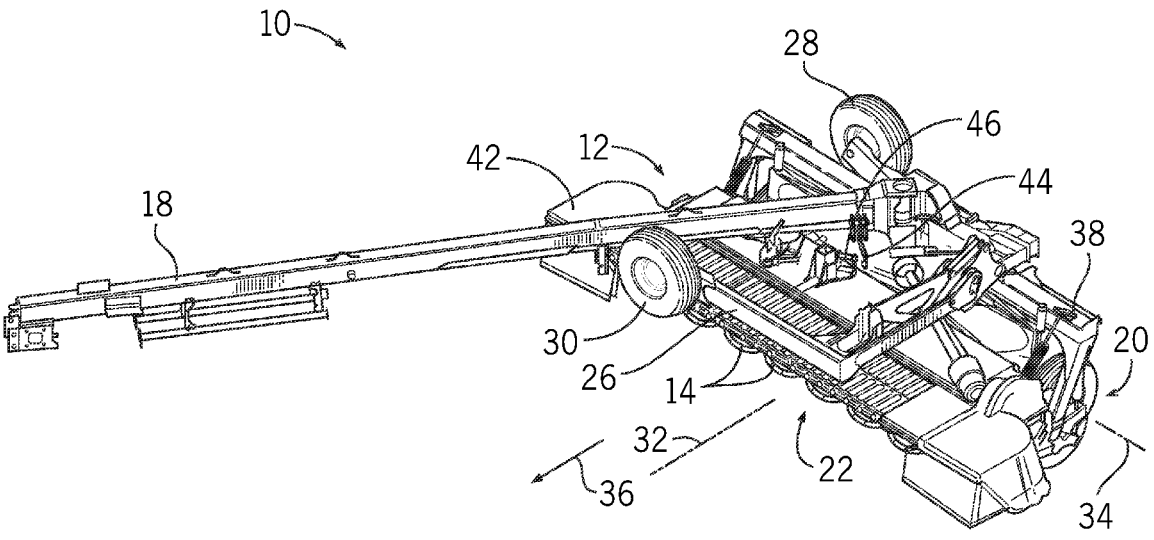
FIG. 4 is another perspective view of the mower of FIGS. 1-3, illustrating the transport arrangement of the present application being deployed.
Figure 5:
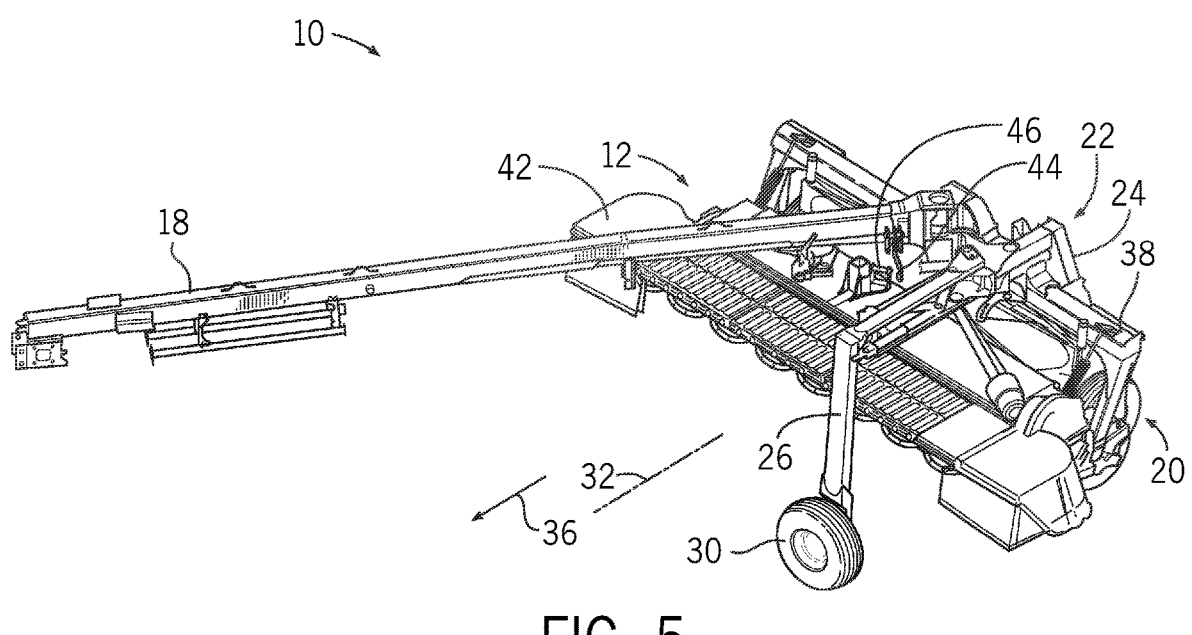
FIG. 5 is yet another perspective view of the mower of FIGS. 1-4, illustrating the transport arrangement of the present application being further deployed lifting the chassis of the mower.

Once transport arrangement 22 is positioned as shown in FIG. 4, then both suspension elements 24 and 26 are rotated about axis 32 by a secondary lateral transport cylinder 27 causing wheels 28 and 30 to contact the ground thereby lifting chassis 12 so that field suspension system 20 is lifted off of the ground. Field suspension system 20 can be coordinated to also lift its field wheels 11A and 11B while or after transport wheels 28 and 30 contact the ground but after header 42 is secured in a raised position. A result of this step is that transport arrangement 22 is fully deployed as seen in FIG. 5 and is in the transport position, except for the position of tongue 18. In FIGS. 1-5, retaining system 40 is not engaged and header 42 is completely under the control of actuators 13A, 13B that position header 42 as suspension system 20 is deployed or retracted.

Figure 6:
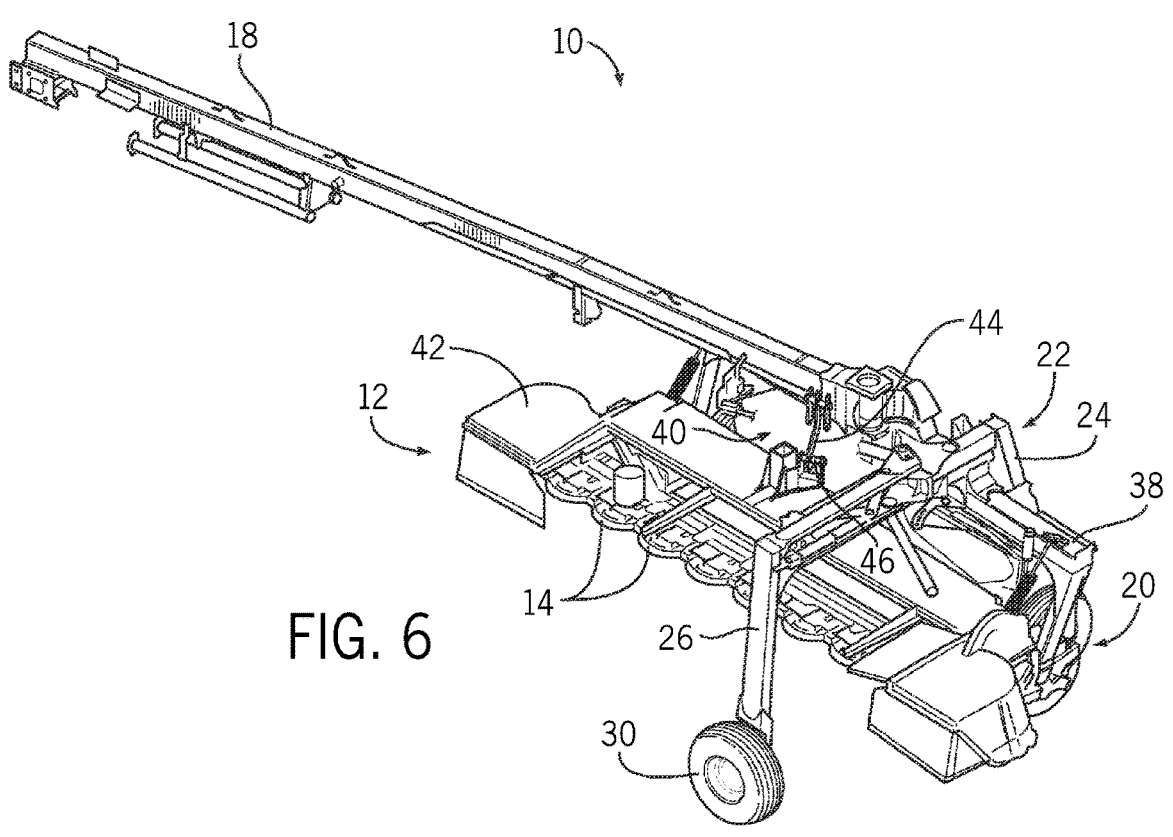
FIG. 6 is yet another perspective view of the mower of FIGS. 1-5, illustrating the tongue of the mower being pivoted to a transport position and the retaining system being engaged.

The next step is that tongue 18 is now swung by a cylinder 29 to a transport position as shown in FIG. 6 about an axis 50 (shown in FIG. 1). This step has to wait on the full deployment of transport arrangement 22 to prevent mower 10 from tipping to one side.

As tongue 18 is completely moved to the position shown in FIG. 6, hook 44 is moved along a circular path A (illustrated in FIG. 2) until it engages retaining pin 46 thereby securing header 42 in the raised position. With header 42 secured in a raised position if actuators 13A, 13B that are used to raise header 42 are retracted, or simply slowly relax, retaining system 40 holds header 42 in the raised position as shown in FIGS. 6-9.

Figure 7:
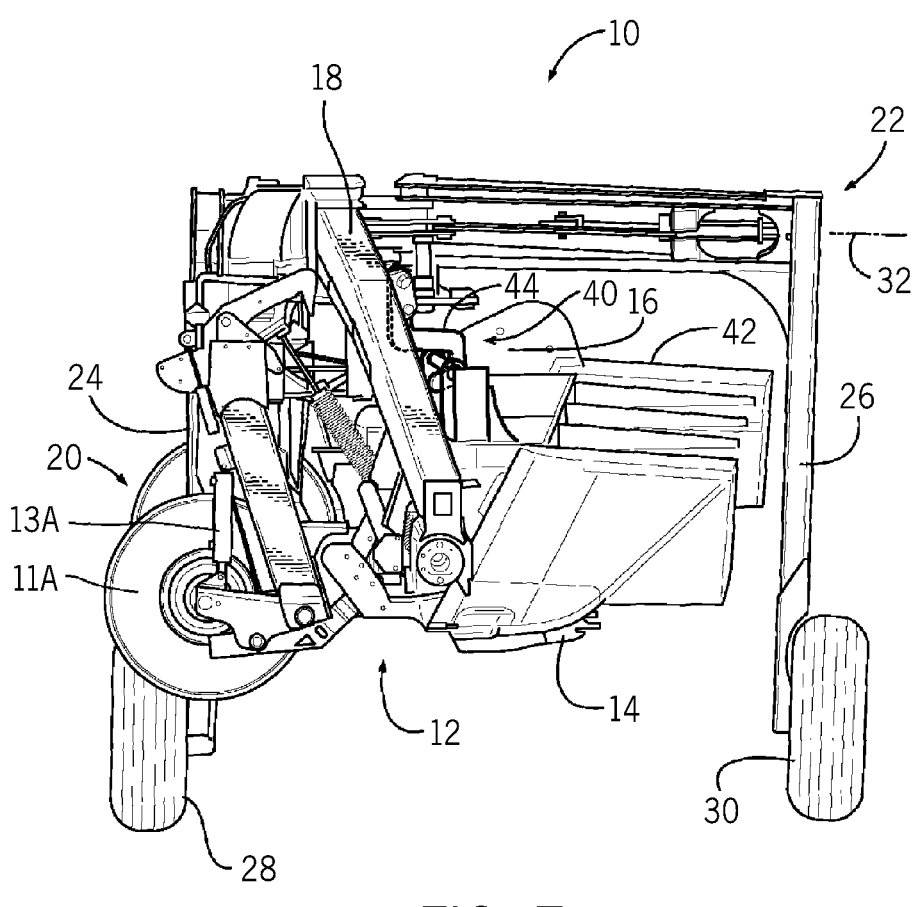
FIG. 7 is a front view of the mower of FIGS. 1-6, illustrating the transport arrangement of the present application being deployed for transporting the mower, from the perspective of the operator in a tractor.
Figure 8:
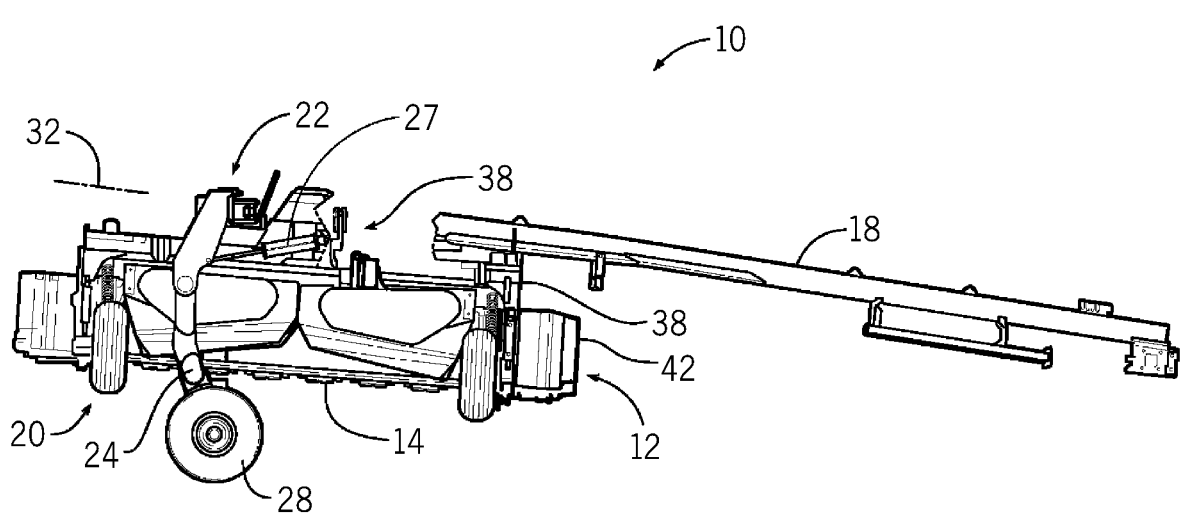
FIG. 8 is a side view of the mower of FIGS. 1-7, illustrating the transport arrangement of the present application being fully deployed having lifted the header of the mower and engaged the retaining system.
Figure 9:
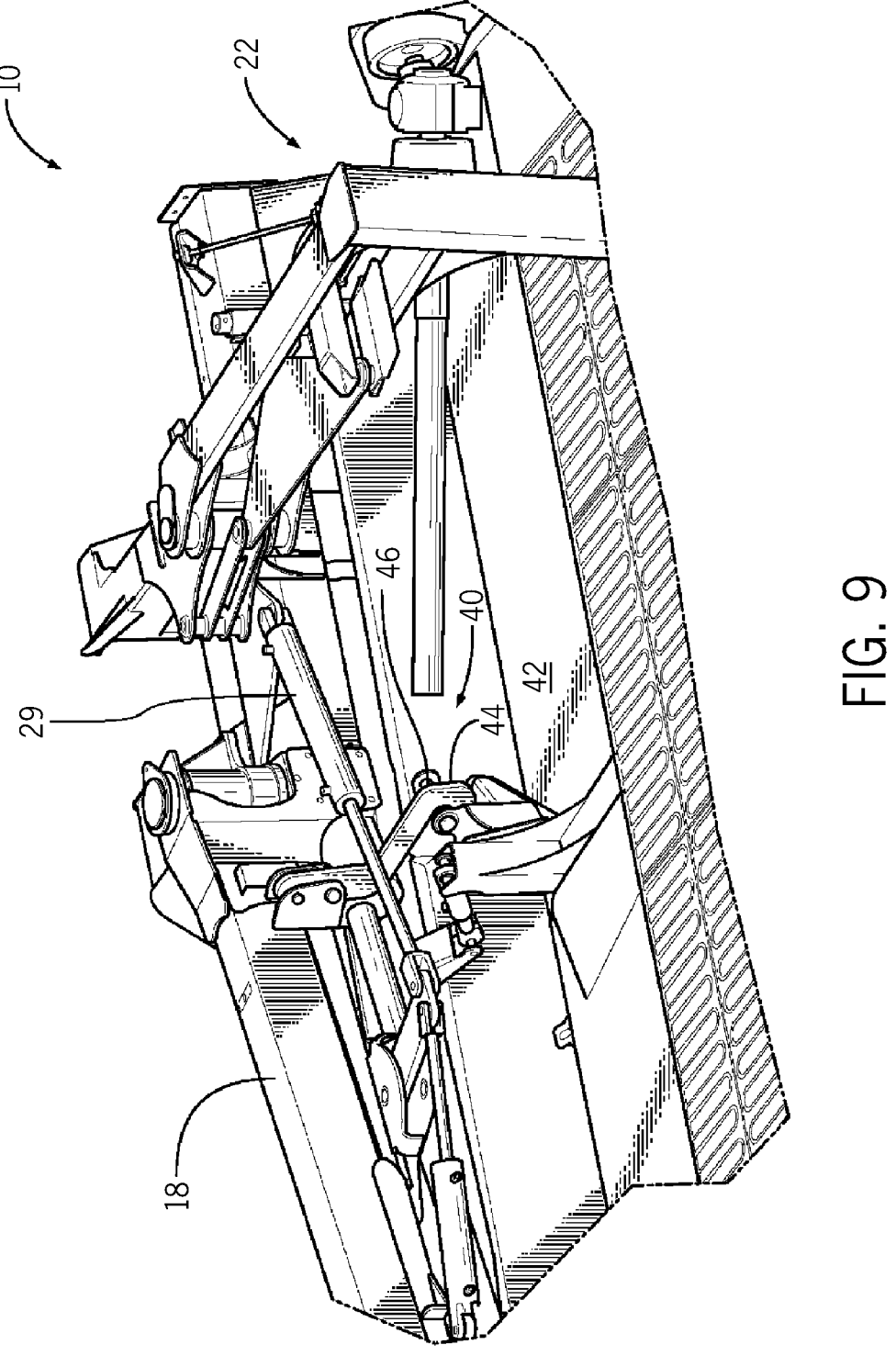
FIG. 9 is a partial view of the transport arrangement of FIGS. 1-8 showing details of the retaining system.

The wheels 11A and 11B of field suspension system 20 are raised to provide ground clearance by the retraction of the lift cylinders 13A and 13B associated with field suspension system 20 (as can be seen in FIGS. 7 and 8). FIGS. 7 and 8 show mower 10 in the transport mode respectively from the operator viewpoint and the right hand side of mower 10.

The steps needed to configure mower 10 for field use are the reverse of those just discussed in order to transition from the transport position to the stowed position of transport arrangement 22. The position of tongue 18 in the transport mode is at a small angle to the tracking of mower 10, as seen in FIG. 7, so as to position the hitch in the desired location for connection with the tractor.

Transport arrangement 22 is coupled to chassis 12 and more particularly to trail frame 38, which is part of chassis 12. The coupling of transport arrangement 22 is offset to the side of the centerline of mower 10. The folding mechanism of transport arrangement 22 is provided to allow at least portions of transport arrangement 22 to be stowed above and to the rear of the trail frame 38 during field operations. Upon placing the center pivot disc mower conditioner 10 (CPDMC) in the full field left position, the mechanism of transport arrangement 22 rotates about a pivot axis 34 that is parallel to or substantially parallel to the trail frame 38 (or the axis of the field wheels). This action can deploy the left hand (as in transport position) wheel 30 to a position ahead of the header (ahead as in the field position) while still located above the trail frame 38. When this rotation has been completed, a secondary rotation takes place about axis 32; this action is a pivoting action, which is above, and perpendicular to the trail frame 38 and the field wheel axis. This action rotates wheels 28 and 30 from their position above trail frame 38 to a position below trail frame 38 and in contact with the ground.

When this action is complete, the trail frame/header is then rotated to a position essentially in-line with tongue 18, thus allowing a narrow transport for public roads. The steps to transition from field operation to lateral transport operation are thus:

1. Fully lift chassis 12 to the non-mowing position by extending the field wheels 11A, 11B of field suspension system 20 by the lift cylinders 13A, 13B;
2. Rotate chassis 12 to the full field left position;
3. Extend the primary lateral transport cylinder 25 to rotate suspension element 26 along with wheel 30 from a position above and behind the trail frame 38 to a position above and ahead of the trail frame 38;
4. Extend the secondary lateral transport cylinder 27 to rotate suspension elements 24 and 26 with wheels 28 and 30 down below the trail frame 38, with wheel 28 being behind the header/trail frame 38 and wheel 30 being in front of the header/trail frame 38;
5. Initiate the system to complete the rotation of chassis 12 to the full lateral transport position and retract the lift cylinders 13A, 13B to raise the field wheels 11A, 11B. The steps to transition from lateral transport to field operation are then to reverse the actions starting with step 5 and working backward to step 1.

Header unit 42 is carried by suspension system 20. The tongue 18 arrangement is coupled to suspension system 20, with the tongue 18 arrangement being pivotal about an axis 50 relative to header unit 42 and suspension system 20. The retaining system 40 is configured to releasably couple the tongue 18 arrangement to header unit 42 and/or suspension system 20 to thereby retain header unit 42 in an elevated position. As can be seen in FIG. 1, hook 44 has a U-shaped opening, which is positioned in an offset fashion relative
to tongue 18, and the U-shaped opening is open in a generally horizontal direction. The U-shaped opening is configured to have a generally reduced throat toward the bottom of the U-shape, in order to capture, then retain, retaining pin 46.

The subject disclosure includes a tongue-mounted hook 44 extending down toward header 42. Hook 44 has a corresponding retaining pin 46 or shaft 46 mounted on the top of header 42. When header 42/trail frame 38 are rotated to the full lateral transport position, where header 42 and trail frame 38 are basically parallel to tongue 18, then hook 44, hanging down from tongue 18, and shaft 46 extending up from header 42 engage. When the field wheels 11A, 11B are lifted by lift cylinders 13A, 13B to provide ground clearance, the engagement of hook 44 with shaft 46 does not allow header 42 to lower. However, the coupling of the header lift arms to the wheel arms allows the field wheels 11A, 11B to be lifted up.

Figure 10:
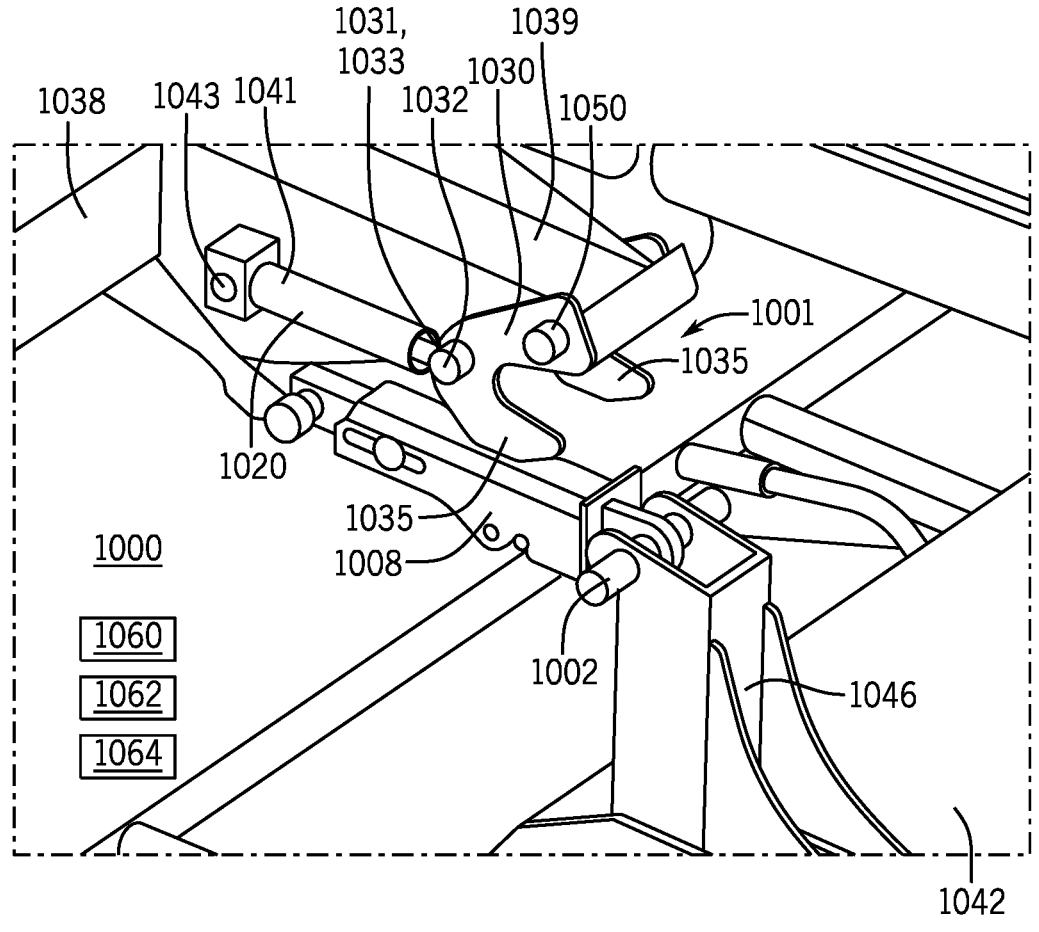
FIG. 10 shows a modification to the retaining system of FIG. 9, according to aspects of the invention, whereby the retaining system is automated, and wherein the retaining system is shown disconnected from a lowered header.
Figure 11:
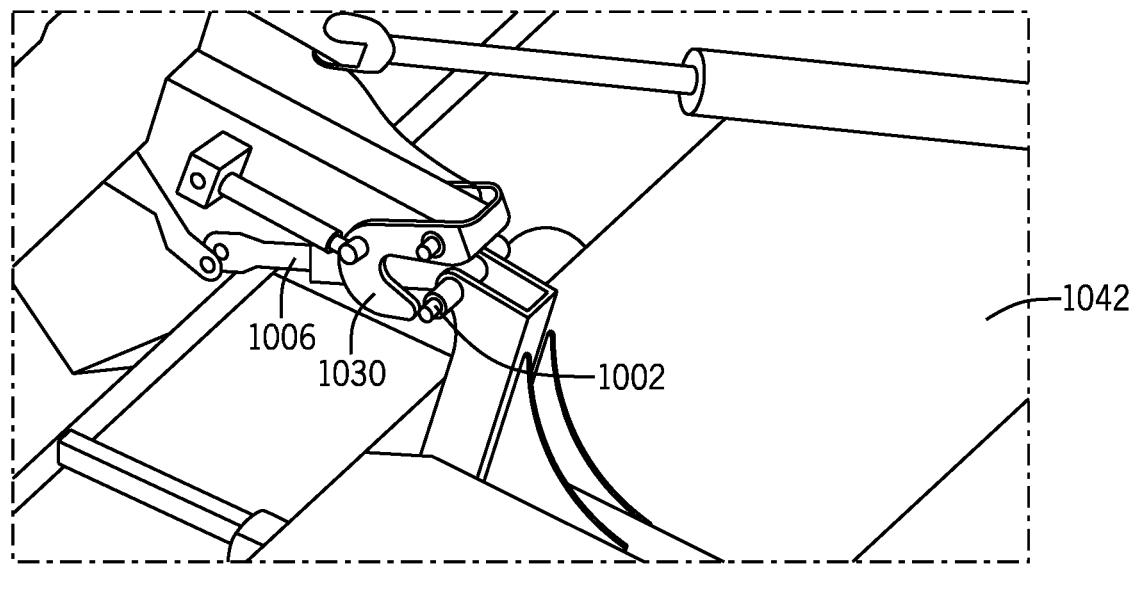
FIG. 11 shows the retaining system of FIG. 10, wherein the retaining system is shown disconnected from a raised header.
Figure 12:
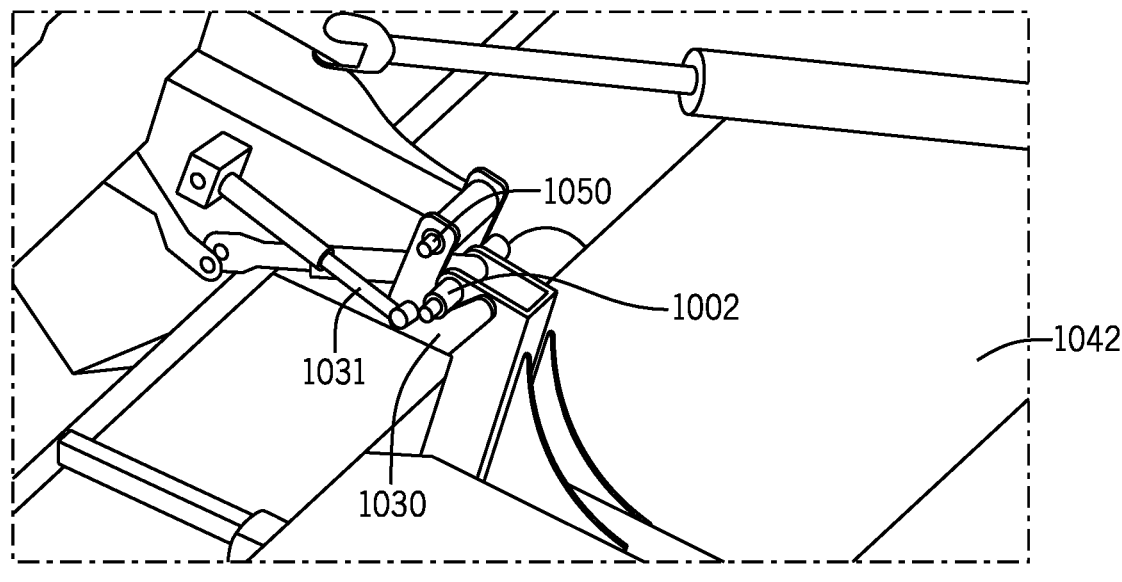
FIG. 12 shows the retaining system of FIGS. 10-11, wherein the retaining system is shown connected to the raised header.

Turning now to FIGS. 10-12, those figures depict the top side of a portion of a mower 1000, which is substantially similar to the mower of FIGS. 1-8, but with an automated retaining system 1001 for retaining the header 1042 in the elevated position with respect to trail frame 1038 for transport. The header 1042 is substantially similar to the header 42, and only the differences therebetween will be described. Also, the trail frame 1038 is substantially similar to the trail frame 38, and only the differences therebetween will be described.

The mower 1000 of FIG. 10-12 includes automated retaining system 1001 for retaining header 1042 in an elevated position for transport. Unlike retaining system 40, retaining system 1001 of FIGS. 10-12 is actively controlled and fully automated to move between a retracted position (shown in FIGS. 10-11) and a deployed position (FIG. 12). In the retracted position, the retaining system 1001 is not positioned to retain the header 1042 in the elevated position, but, in the deployed position, the retaining system is positioned to retain the header 1042 in the elevated position. In summary, retaining system 1001 generally includes an actuator 1020, a hook 1030 whose movement is controlled by actuator 1020, and a pin 1002 that is engaged by hook 1030 to retain the header 1042 in the elevated position. Pin 1002 may or may not be considered as forming part of retaining system 1001.

Header 1042 includes a beam 1046 extending vertically upwards from the top surface of header 1042, like the previously described shaft 46, with the exception that the top end of beam 1046 includes a pin 1002 that is fixed thereto. Pin 1002 projects transversely from the opposing sides of beam 1046 for selective engagement with a hook 1030, as will be described later. The structure of pin 1002 may vary from that which is shown and described. For example, pin 1002 may be substituted with a hole or opening formed in beam 1046, a male fastener, a female fastener, a clip, a clamp, and so forth.

Trail frame 1038 includes a forwardly extending structural member or beam 1039 that extends longitudinally from the side of trail frame 1038 facing header 1042. An actuator 1020 is mounted to a side surface of beam 1039.

Actuator 1020 may include a piston and cylinder arrangement, as shown, with the piston 1031 being slideably mounted within the cylinder 1041. Actuator 1020 may also be referred to herein as the "second actuator." The proximal end of cylinder 1041 is rotationally mounted to the beam 1039 by a shaft 1043 such that the entire actuator 1020 can rotate with respect to beam 1039. The distal end 1033 of the piston 1031, which can protrude from the cylinder 1041, is pivotably mounted to a hook 1030. A shaft 1032 (or pin) is fixed to hook 1030. An eyelet formed at the distal end 1033 of the piston 1031 is mounted over the shaft 1032 such that piston 1031 is capable of rotating relative to shaft 1032, or vice versa. A fastener may be mounted on the shaft 1032 to prevent the eyelet end 1033 from becoming disconnected from the hook 1030.

The hook 1030 has at least one J-shaped body 1035. According to the example shown, the hook 1030 has two J-shaped bodies 1035 that are interconnected by a bracket and disposed on opposite sides of beam 1039. The hook 1030 is also pivotably mounted to the distal end of beam 1039 by a fastener arrangement 1050. The fastener arrangement 1050 may comprise a bolt that is positioned through openings formed in the beam 1039 as well as both J-shaped bodies 1035, and a threaded nut that is mounted to the end of the bolt to secure the hook 1030 to the beam 1039 while permitting rotation of hook 1030 relative to beam 1039. It should be understood that fastener 1050 is positionally offset from shaft 1032 such that translation of piston 1031 causes rotation of hook 1030.

The hook 1030 may be referred to herein as a first retaining element. Similarly, the pin 1002 may be referred to herein as a second retaining element. The first and second retaining elements are configured to be selectively connected to each other for supporting the weight of header 1042. Those skilled in the art will recognize that the physical structure of those retaining elements can vary greatly.

For example, the hook 1030 may have a C-shape, a U-shape, a stepped surface (e.g., ratchet teeth), and so forth. Hook 1030 may be substituted with another component such as a moveable pin, clip, clamp, ring, bracket, hanger, male fastener, female fastener, opening, hole and so forth, so long as that component can (i) operate with an actuator, like actuator 1020, and (ii) releasably mate with the second retaining element (e.g., pin 1002). Accordingly, hook 1030 is more generally described as a retaining element.

Also, actuator 1020 may vary from that which is shown and described. Actuator 1020 may be powered hydraulically, pneumatically, electrically or manually, for example. The device powering actuator 1020 may be a hydraulic motor, a solenoid, a PTO shaft, a linear motor, or a rotational motor, for example.

The arrangement of the components of retaining system 1001 may vary. For example, actuator 1020 and hook 1030 may be mounted to beam 1046 of header 1042, and pin 1002 may be mounted to beam 1039 to achieve a similar result. Also, actuator 1020 and hook 1030 may be mounted to the tongue 18.

Turning now to operation of retaining system 1001, FIG. 10 shows the retaining system disconnected from a header 1042 that is maintained in a lowered position. According to one example of the invention, prior to actuating retaining system 1001 (i.e. moving retaining system from the retracted/withdrawn position to the extended/deployed position), header 1042 is first moved to the raised position shown in FIG. 11. Moving the header 1042 to the raised position moves pin 1002 closer to hook 1030. The field wheels 11A/11B of header 1042 may (or may not) be lifted at this stage. Actuator 1020 is then actuated, i.e., moved from a withdrawn position of FIG. 11 to an extended position of FIG. 12, during which time piston 1031 extends from cylinder 1041. Extension of piston 1031 causes hook 1030 to pivot in the counterclockwise direction (as viewed in FIG. 12) about the axis of shaft 1050. It is noted that actuator 1020 rotates slightly about shaft 1043 as hook 1030 pivots about shaft 1050. As hook 1030 pivots in the counterclockwise direction about shaft 1050, the curved interior recess of the hook 1030 engages pin 1002. Engagement between hook 1030 and pin 1002 prevents downward movement of header 1042. With header 1042 secured in a raised position, if actuators 13A, 13B that are used to raise header 1042 are retracted, retaining system 1001 holds header 1042 in the raised position shown in FIG. 12. Mower 1000 may then be transported.

Following transport, to disconnect hook 1030 from pin 1002, the user actuates actuator 1020 to move from the extended position back to the withdrawn position.

A computer controller 1060 is electrically coupled to receive/transmits signals to/from actuator 1020, actuators 13A, 13B, a sensor 1062 that monitors the actuation state of actuator 1020, and a sensor 1064 that monitors the actuation state of actuators 13A, 13B. Controller 1060 may be programmed to move actuator 1020 to the extended position only after actuators 13A, 13B have raised header to the elevated position, as detected by sensor 1064. Controller 1060 may be programmed to retract actuators 13A, 13B only after sensor 1062 confirms that actuator 1020 is in the extended position. Controller 1060 may further be programmed to move actuator 1020 from the extended position to the retracted position only if actuators 13A, 13B have raised the header to the elevated position, as detected by sensor 1064.

It is to be understood that the operational steps described herein are performed by the controller/computer 1060 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 1060 described herein is implemented in software code or instructions which are tangibly stored on a tangible computer readable medium. Upon loading and executing such software code or instructions by the controller 1060, the controller 1060 may perform any of the functionality of the controller 1060 described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this disclosure has been described with respect to at least one embodiment, the subject disclosure can be further modified within the spirit and scope of this disclosure. This application is therefore intended to cover any variations, uses, or adaptations of the disclosure using its general principles. Further, this application is intended to cover such departures from the subject disclosure as come within known or customary practice in the art to which this disclosure pertains and which fall within the limits of the appended claims.

What is claimed is:

1. An agricultural mower comprising:
a chassis;
at least one wheel coupled to the chassis;
a header unit coupled to the chassis;
a first actuator that moves the header unit relative to the chassis between a field position, in which the at least one wheel contacts a ground surface to support the header unit, and an elevated position in which the header unit is positioned further from the ground surface as compared with the field position;
a first retaining element mounted to one of the chassis and the header unit;
a second retaining element mounted to the other of the chassis and the header unit, the second retaining element being releasably engaged to the first retaining element;
a second actuator that moves the first retaining element from a first position in which the first retaining element is remote and disengaged from the second retaining element to a second position in which the first retaining element is engaged with the second retaining element such that the chassis supports at least a portion of a weight of the header unit via the engaged first and second retaining elements; and
a computer controller that actuates the second actuator to move the first retaining element from the first position to the second position only after the first actuator has raised the header unit to the elevated position.

2. The agricultural mower as claimed in claim 1, wherein the first actuator moves the header unit to place the second retaining element in a travel path of the first retaining element to allow the first retaining element to capture the second retaining element as the second actuator moves the first retaining element to the second position.

3. The agricultural mower as claimed in claim 1, wherein the chassis includes a tongue arrangement, the tongue arrangement being pivotal about a generally vertical axis relative to the header unit and the chassis, wherein the tongue arrangement pivots from a field mode to a transport mode.

4. The agricultural mower as claimed in claim 1, wherein the header unit includes a plurality of crop engaging blades.

5. The agricultural mower as claimed in claim 1, wherein the first retaining element is a hook having a curved surface that engages the second retaining element, wherein the first retaining element is pivotally connected to the chassis between the first position and the second position.

6. The agricultural mower as claimed in claim 5, wherein the second retaining element is a pin or shaft that is fixed to the header unit.

7. The agricultural mower as claimed in claim 1, wherein the second actuator is a hydraulic cylinder.

8. The agricultural mower as claimed in claim 1, wherein the second actuator includes a cylinder and a piston that is slideably mounted within the cylinder, and wherein the cylinder is mounted to the chassis.

9. The agricultural mower as claimed in claim 8, wherein the cylinder is pivotally mounted to the chassis.

10. The agricultural mower as claimed in claim 8, wherein an end of the piston is pivotably mounted to the first retaining element to move the first retaining element between the first and second positions.

11. The agricultural mower as claimed in claim 1, wherein, in a transport mode of the mower, the computer controller deactivates the first actuator only after the second actuator is in an extended position and the first and second retaining elements are engaged together.

12. The agricultural mower as claimed in claim 1, wherein the computer controller actuates the second actuator to return the first retaining element back to the first position only after the first actuator has raised the header unit to the elevated position.

13. The agricultural mower as claimed in claim 1, wherein the first retaining element engages the second retaining element to retain the header unit in the elevated position without a use of hydraulic actuators.

14. The agricultural mower as claimed in claim 5, wherein the hook is pivotably connected to the chassis and the hook is also connected to the second actuator, wherein actuation of the second actuator causes the hook to pivot with respect to the chassis.

15. The agricultural mower as claimed in claim 14, wherein the hook includes a hook shaped body having two ends, wherein a pivotal connection between the hook and the chassis is arranged at one end of the two ends, and a second connection between the second actuator and the hook is arranged at a location between the two ends.

\* \* \* \* \*